(12) United States Patent
Chen et al.

(10) Patent No.: US 7,436,558 B2
(45) Date of Patent: Oct. 14, 2008

(54) CONNECTING MECHANISM FOR SCAN CARRIAGE AND AXIAL ROD

(75) Inventors: Chi-Feng Chen, Taipei (TW); Hsin-Tang Chien, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 997 days.

(21) Appl. No.: 10/928,101

(22) Filed: Aug. 30, 2004

(65) Prior Publication Data

US 2006/0059660 A1    Mar. 23, 2006

(51) Int. Cl.
*H04N 1/04* (2006.01)

(52) U.S. Cl. .................. 358/497; 358/482; 358/474; 358/494

(58) Field of Classification Search ............. 358/497, 358/482, 474, 494, 406; 399/208
See application file for complete search history.

(56) References Cited

U.S. PATENT DOCUMENTS

| 4,355,883 | A | * | 10/1982 | Landa | 399/90 |
| 5,691,825 | A | * | 11/1997 | Fujiwara | 358/497 |
| 5,913,091 | A | * | 6/1999 | Nanba et al. | 399/32 |
| 2003/0169463 | A1 | * | 9/2003 | Sheng et al. | 358/474 |

* cited by examiner

*Primary Examiner*—Houshang Safaipour
(74) *Attorney, Agent, or Firm*—Rosenberg, Klein & Lee

(57) ABSTRACT

A connecting mechanism for a scan carriage and an axial rod has a scan carriage, an axial rod, and a connecting device for connecting the scan carriage to the axial rod. The scan carriage has a flange protruding horizontally from a side thereof. The axial rod is disposed under the flange of the scan carriage. The connecting device includes an elastic hooking plate fixed vertically on a bottom surface of the flange, and a pair of lining pads. The hooking plate has a free end bent downwardly and inwardly therefrom against the axial rod. The pair of pads is fixed on two sides of the bottom surface of the flange and lean against the axial rod mating with the hooking plate.

19 Claims, 7 Drawing Sheets

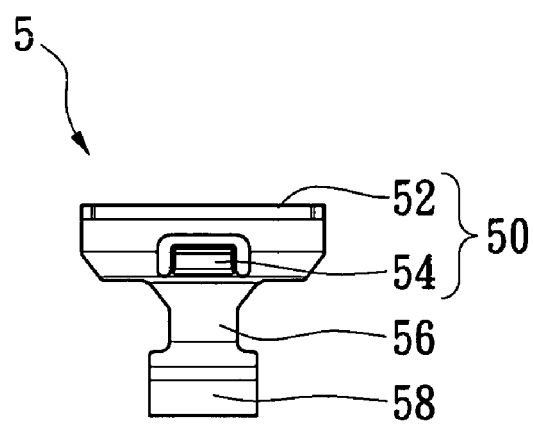
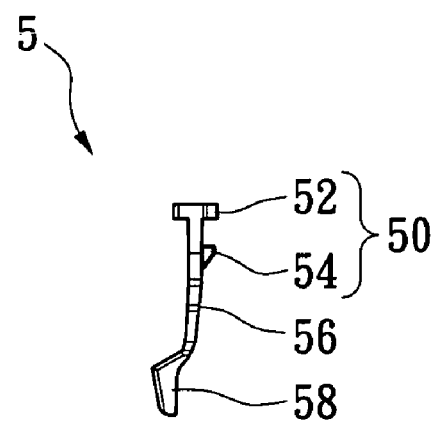
FIG. 4A
FIG. 4B

CONNECTING MECHANISM FOR SCAN CARRIAGE AND AXIAL ROD

BACKGROUND OF THE INVENTION

1. Field of the Invention

The present invention relates to a connecting mechanism for a scan carriage and an axial rod, and particularly to a connecting mechanism applied in a multi-function printer (MFP) where the scan carriage leans tightly against and slides on the axial rod.

2. Description of the Prior Art

FIG. 1 illustrates an optical pick up and transformation device, which is usually mounted in a platform optical scanner or a multi-function printer with the same function, and is commonly called a scan carriage. The scan carriage 9 moves along an axial rod 92 for picking up an image of a scanned document. The scan carriage 9 mainly provides a linear light source 91 which moves linearly along the axial rod 92 and simultaneously emits light upon a document disposed on a glass. The scan carriage 9 also has a reflector, a lens, and an optical-electric transformation device, which is usually a charge coupled device (CCD). The reflected light is received through the lens of the scan carriage 9 by the reflector, and then is focused on the optical-electric transformation device to transform the scanned image data into electrical signals.

To achieve the purpose of sliding, the conventional scan carriage 9 is formed with a pair of pivoting portions 94. Each of the pivoting portions 94 is formed with an axial hole 96, and a sleeve 98 is mounted in the axial hole 96. The axial rod 92 is mounted slidably in the sleeve 98 for achieving linear movement. However, the above-mentioned structure has some disadvantages, which are described as follows:

1. An assembly tolerance between the axial hole 96 and the sleeve 98 of the scan carriage 9 must be highly precise matched tolerance, and there is a problem of concentricity after assembled the axial rod 92. The manufacturing thereof is very difficult.

2. The sleeve 98 and the axial rod 92 must maintain a clearance therebetween for assembly. However, the clearance will cause the scan carriage 9 to shake while moving and accumulate dust, which is detrimental for picking up an image.

Therefore, the optical picking up and transformation device of the prior art still has some inconvenience and disadvantages to be improved. The inventor, after investigation and research, thus provides the present invention of logical design for improving the above-mentioned imperfections.

SUMMARY OF THE INVENTION

An object of the present invention is to provide a connecting mechanism for a scan carriage and an axial rod where the scan carriage clips onto and slidably leans against the axial rod, and is assembled conveniently with high accuracy.

In order to achieve the above objects, the present invention provides a connecting mechanism for a scan carriage and an axial rod comprises a scan carriage, an axial rod, an elastic hooking plate, and a pair of lining pads. The scan carriage has a flange protruding horizontally from a side thereof. The axial rod is disposed under the flange of the scan carriage. The elastic hooking plate is fixed vertically on a bottom surface of the flange. The pair of lining pads is fixed on two sides of the bottom surface of the flange and lean against the axial rod. The lining pads and the hooking plate slidably clip the axial rod therebetween.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 4A is a front view of a hooking plate of the present invention;

FIG. 4B is a side view of the hooking plate of the present invention;

DESCRIPTION OF THE PREFERRED EMBODIMENTS

Figure 1:
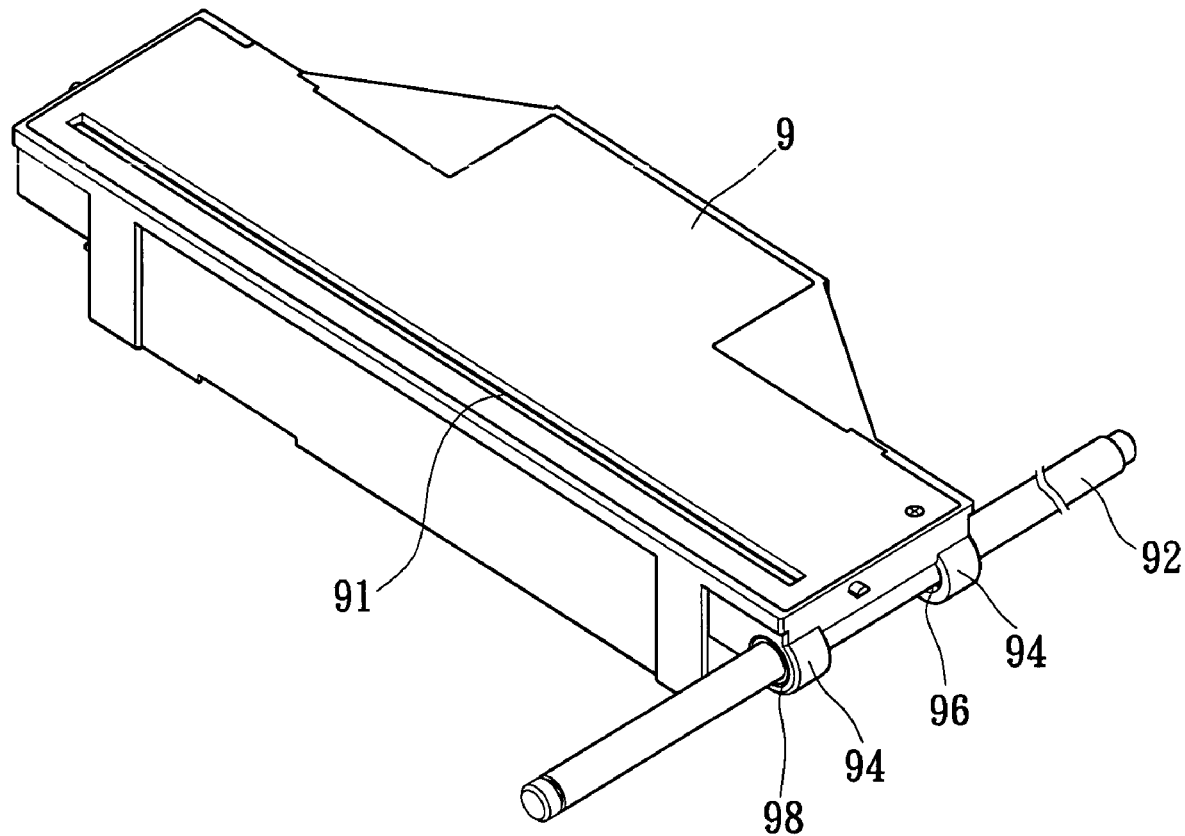
FIG. 1 is a perspective view of a connecting mechanism for a scan carriage and an axial rod of prior art.
Figure 2:
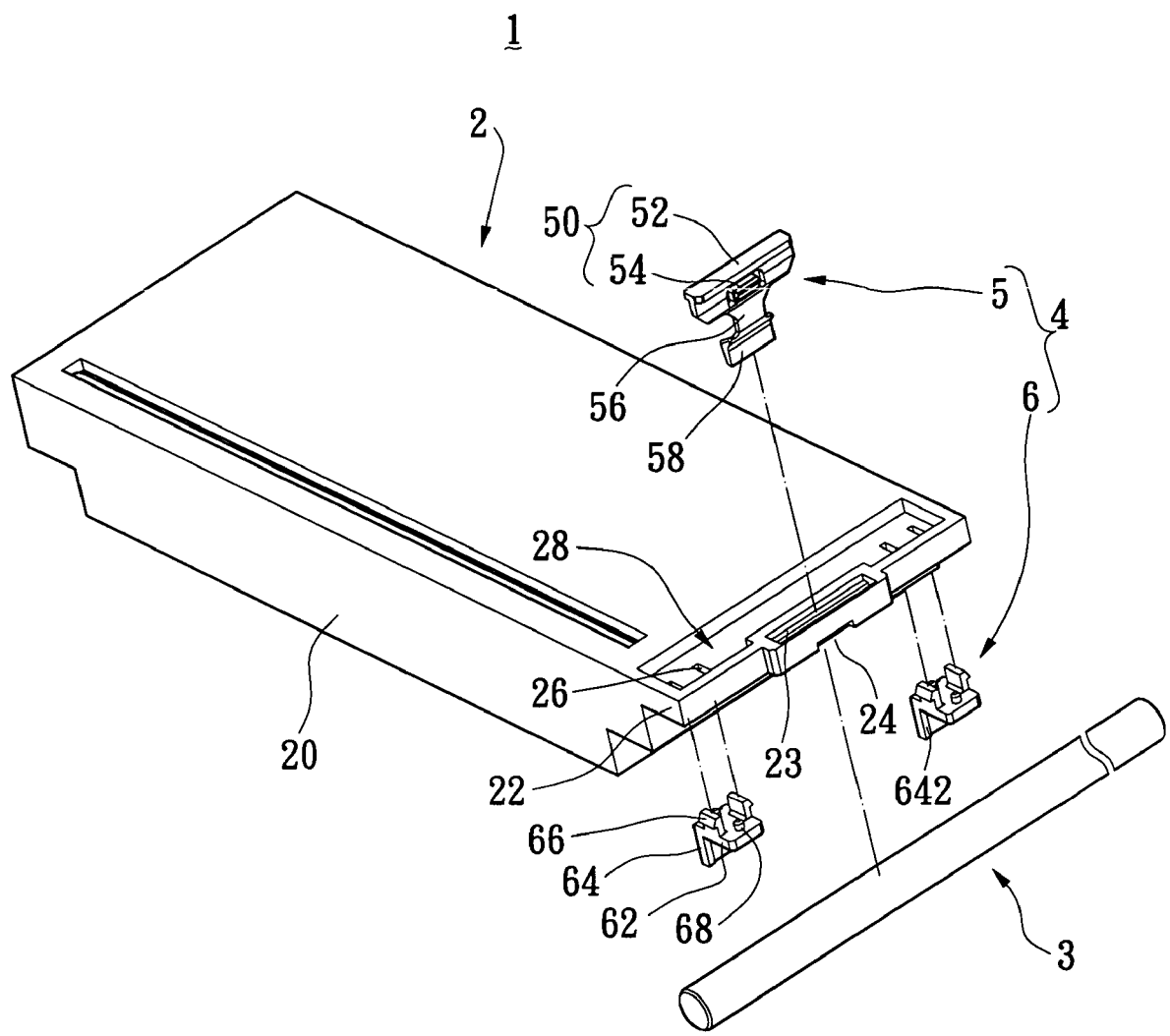
FIG. 2 is an exploded perspective view of a connecting mechanism for a scan carriage and an axial rod according to the present invention.
Figure 3:
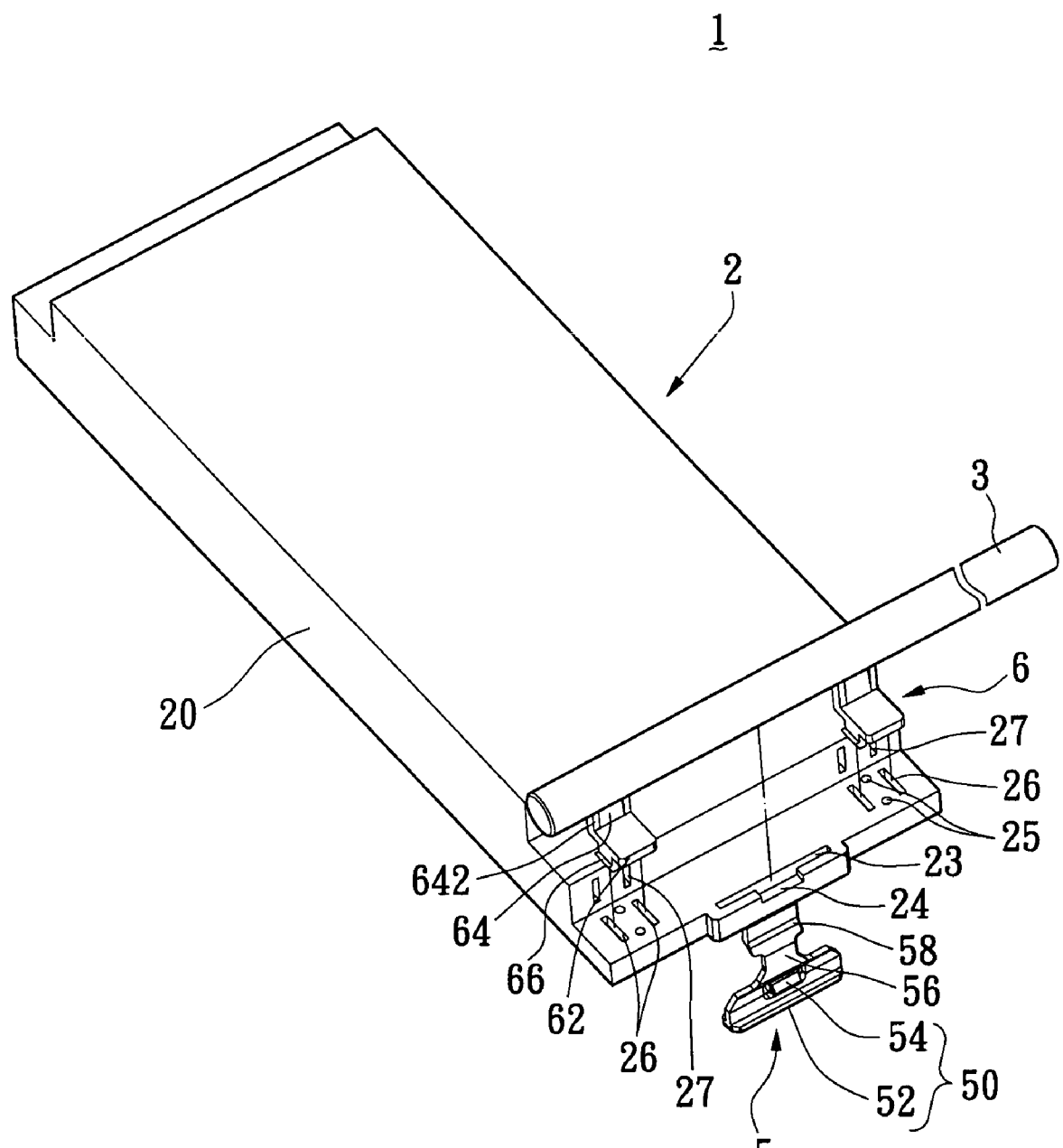
FIG. 3 is another exploded perspective view of the connecting mechanism for a scan carriage and an axial rod according to the present invention.

Referring to FIGS. 2 to 3, different views of a connecting mechanism for a scan carriage and an axial rod are illustrated. The connecting mechanism for a scan carriage and an axial rod 1 comprises a scan carriage 2, a axial rod 3 which is disposed on one side of the scan carriage 2, and a connecting device 4 for connecting the scan carriage 2 to the axial rod 3.

The scan carriage 2 is mounted in a scan machine or a multi-function printer (MFP) (not shown), and has a casing 20 for receiving optical components therein. The casing 20 has a flange 22 protruding horizontally from a side thereof. The axial rod 3 is mounted under the flange 22 of the scan carriage 2 via the connecting device 4.

The connecting device 4 has an elastic hooking plate 5 and a pair of lining pads 6. The hooking plate 5 is fixed vertically on a bottom surface of the flange 22 of the scan carriage 2. The pair of lining pads 6 is fixed on two sides of the bottom surface of the flange 22 of the scan carriage 2 and is leaned slidably against the axial rod 3. The hooking plate 5 has a free end which is bending downwardly and inwardly, and is leaned slidably against the axial rod 3.

In this preferred embodiment of the present invention, the lining pads 6 and the hooking plate 6 of the connecting device 4 are respectively mounted on the scan carriage 2 in an engaging way to reduce the assembly time. The connecting device 4 also can be screwed onto the scan carriage 2. The main characteristic of the present invention is that the lining pads 6 and the hooking plate 5 clip cooperatively and lean against the axial rod 3 therebetween.

Referring to FIGS. 4A and 4B, a front view and a side view of a hooking plate of the present invention are illustrated. The hooking plate 5 has a fixing portion 50 which is formed on a top end thereof, a flexible connecting portion 56, and an oblique portion 58. The flexible connecting portion 56 extends downwardly from the fixing portion 50. The oblique portion 58 bends downwardly and inwardly from the connecting portion 56 and leans against the axial rod 3. The fixing portion 50 of the hooking plate 5 is engaged with the flange 22 of the scan carriage 2. In this embodiment, the fixing portion 50 has a stopping portion 52 which is formed on a top end thereof and at least one barb 54 which is parallel to the stopping portion 52.

The flange 22 of the scan carriage 2 has a longitudinal latching slot 23 and at least one barb slot 24. The stopping portion 52 of the hooking plate 5 is latched in the latching slot 23, and the barb 54 is engaged in the barb slot 24. In the embodiment, the latching slot 23 is formed on a middle portion of the flange 22 of the scan carriage 2 and is generally T-shaped, and the barb slot 24 is formed on a bottom of an outside of the flange 22. The hooking plate 5 is downwardly engaged in the latching slot 23, so that the stopping portion 52 and the barb 54 clip the shells of the flange 22 therebetween. The stopping portion 52 and the barb 54 can be formed inversely on the hooking plate 5 (not shown), and the barb slot 24 is formed on a top portion of the flange 22, so that the hooking plate 5 can be engaged in the latching slot 23 upwardly (not shown).

Figure 5A:
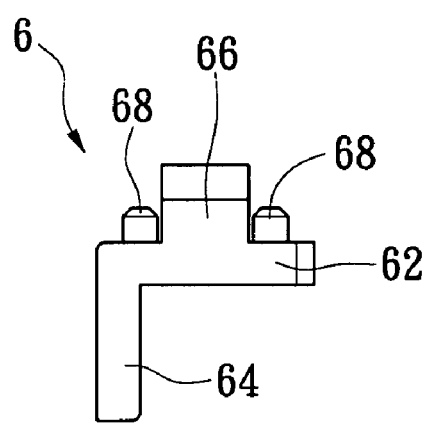
FIG. 5A is a side view of a lining pad of the present invention.
Figure 5B:
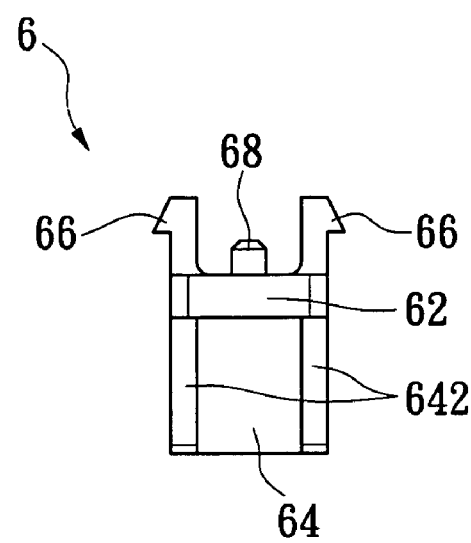
FIG. 5B is a front view of the lining pad of the present invention.

Referring to FIGS. 5A and 5B, a lining pad of the present invention is illustrated in a front view and a side view. Each of the lining pads 6 is generally L-shaped, and has a horizontal portion 62 and a vertical portion 64. The horizontal portion 62 is fixed on a bottom surface of the flange 22, and the vertical portion 64 is connected to the horizontal portion 62. The horizontal portion 62 and a vertical portion 64 define two smooth leaning surfaces for slidably leaning against the axial rod 3. The horizontal portion 62 of the lining pad 6 has two parallel engaging hooks 66 which are protruding from a top surface thereof. The flange 22 of the scan carriage 2 is formed with two engaging slots 26 corresponding to the engaging hooks 66. To avoid projecting the engaging hooks 66 outside the top surface of the scan carriage 2, the flange 22 of the scan carriage 2 further has a concave groove 28 that is formed in a top surface thereof. The engaging hooks 66 of the lining pad 6 are exposed outside a top surface of the engaging slot 26 and are received in the concave groove 28.

The horizontal portion 62 of the lining pad 6 further has at least one position post 68 which is protruding from a top surface thereof. A bottom surface of the flange 22 of the scan carriage 2 is concaved with a position hole 25 corresponding to the position post 68. In this embodiment, there are a pair of position posts 68 and a pair of position holes 25, so that enhances the stability of the horizontal portion 62 and prevents shaking.

The vertical portion 64 of the lining pad 6 is generally I-shaped along a horizontal cross-section, and has two ribs 642 which are formed respectively on two sides thereof. Such a structure can enhance the rigidity of the vertical portion 64 and reduce the friction area between the vertical portion 64 and the axial rod 3, as well as control the accuracy of assembling. An inside surface of the scan carriage 2 adjacent to the flange 22 is formed with two position grooves 27 which are corresponding to the ribs 642 of the vertical portion 64. The lining pads 6 are thus more stable along a lateral direction to avoid sliding transversely. Naturally, the two sides of the vertical portion 64 can be smooth and without ribs.

Figure 6:
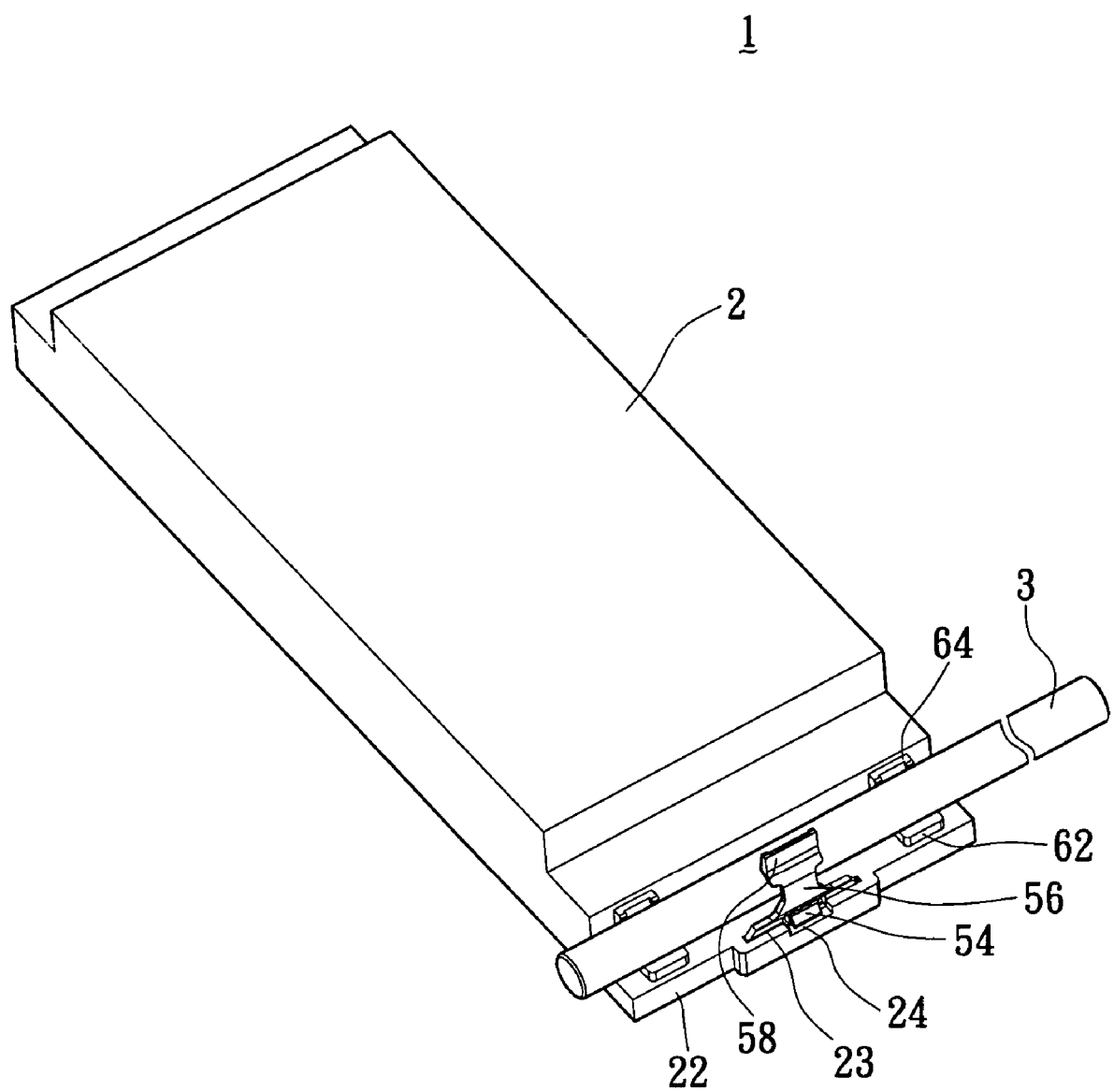
FIG. 6 is an assembly perspective view of the connecting mechanism for a scan carriage and an axial rod according to the present invention.
Figure 7:
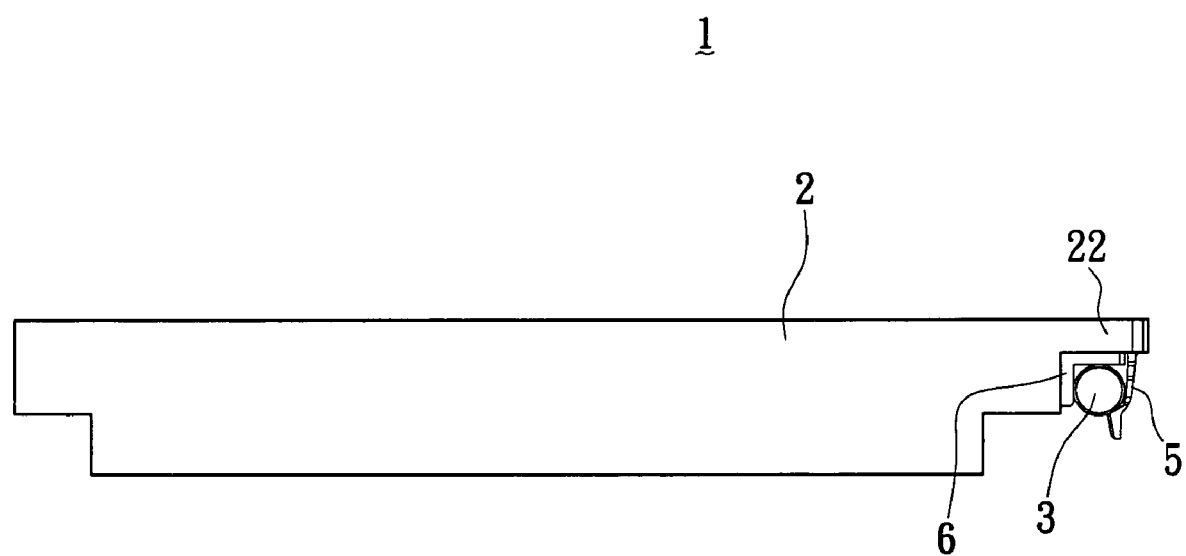
FIG. 7 is assembly front view of the connecting mechanism for a scan carriage and an axial rod according to the present invention.

Referring to FIGS. 6 and 7, an assembly perspective view and an assembly front view of a connecting mechanism for a scan carriage and an axial rod according to the present invention are respectively illustrated. The present invention applies two L-shaped lining pads 6 and a piece of hooking plate 5 cooperatively to let the scan carriage 2 slide on the axial rod 3. The lining pads 6 of the present invention are designed with two leaning surfaces to control the assembly position and accuracy of the axial rod 3. The development of the molds is also convenient. The hooking plate 5 exerts pressure upon the axial rod 3 cooperatively, so that the scan carriage 2 leans tightly against the axial rod 3 and is sliding stably, and also prevents the axial rod 3 from escaping.

The choice of the material of the lining pads 6 and the hooking plate 5 is flexible, and includes POM (Polyacetal, Polyoxy Methylene) and Teflon, for example. POM is a high crystalline polymer and has a high degree of hardness, intensity, and rigidity in a wide temperature range. In particular, POM has a good characteristic of low coefficient of friction and is self-lubricating. If lubricating oil or lubricant is used, the friction characteristic is improved.

A summary of the characteristics and advantages of the present invention, is as follows:

1. The L-shaped lining pads that lean against the axial rod can reach a zero-clearance combination through the weight of the scan carriage itself.

2. The L-shaped lining pads lean tightly against the rigid axial rod through the hooking plate with a proper elastic force, so that the scan carriage does not sway while picking up pictures.

3. Manufacturing of the structure according to the present invention is easy, because only the size of the leaning surfaces for the scan carriage matching with the L-shaped lining pads and the axial rod need be controlled.

4. The lining pads and axial rod are assembled on the scan carriage in an engaging way, so the assembly thereof is very convenient and quick.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A connecting mechanism for a scan carriage and an axial rod, comprising:
   a scan carriage having a flange protruding horizontally from a side thereof;
   a axial rod disposed under the flange of the scan carriage;
   an elastic hooking plate fixed vertically on a bottom surface of the flange; and
   a pair of lining pads fixed on two sides of the bottom surface of the flange and leaning against the axial rod, the lining pads and the hooking plate slidably clipping the axial rod therebetween.

2. The connecting mechanism for a scan carriage and an axial rod as in claim 1, wherein the hooking plate has a fixing portion formed on a top end thereof, a flexible connecting portion extending downwardly from the fixing portion, and an oblique portion bending downwardly and inwardly from the connecting portion.

3. The connecting mechanism for a scan carriage and an axial rod as in claim 2, wherein the fixing portion of the hooking plate is latched in the flange of the scan carriage, and has a stopping portion formed thereon and at least barb parallel to the stopping portion.

4. The connecting mechanism for a scan carriage and an axial rod as in claim 3, wherein the flange of the scan carriage has a longitudinal latching slot and at least one barb slot, wherein the stopping portion of the hooking plate is latched in the latching slot and the barb is engaged in the barb slot.

5. The connecting mechanism for a scan carriage and an axial rod as in claim 4, wherein the latching slot of the flange is formed on a middle portion thereof and the barb slot is formed on a side thereof.

6. The connecting mechanism for a scan carriage and an axial rod as in claim 1, wherein each of the lining pads is formed with two smooth leaning surfaces vertically, and wherein the two leaning surfaces are slidably leaned against the axial rod.

7. The connecting mechanism for a scan carriage and an axial rod as in claim 1, wherein each of the lining pads is generally L-shaped and has a horizontal portion fixed on a bottom surface of the flange and a vertical portion connecting to the horizontal portion.

8. The connecting mechanism for a scan carriage and an axial rod as in claim 7, wherein the horizontal portion of the lining pad has two parallel engaging hooks protruding from a top surface thereof, and wherein the flange of the scan carriage is formed with two engaging slots corresponding to the engaging hooks.

9. The connecting mechanism for a scan carriage and an axial rod as in claim 8, wherein the flange of the scan carriage further includes a concave groove in a top surface thereof, and wherein the engaging hooks of the lining pad are exposed by a top end of the engaging slot and received in the concave groove.

10. The connecting mechanism for a scan carriage and an axial rod as in claim 7, wherein the horizontal portion of the lining pad further has at least one position post protruding from a top surface thereof, and wherein a bottom surface of the flange of the scan carriage is concave with a position hole corresponding to the position post.

11. The connecting mechanism for a scan carriage and an axial rod as in claim 7, wherein the vertical portion of the lining pad is generally I-shaped along a horizontal cross-section, and has two ribs formed respectively on two sides thereof.

12. The connecting mechanism for a scan carriage and an axial rod as in claim 11, wherein an inside surface of the scan carriage adjacent to the flange is formed with two position grooves corresponding to the ribs of the vertical portion.

13. A connecting device of scan carriage for connecting a scan carriage to a axial rod, wherein the scan carriage has a flange, comprising:
- an elastic hooking plate having a fixing portion fixed vertically on a bottom surface of the flange, a flexible connecting portion extending downwardly from the fixing portion, and an oblique portion bending downwardly and inwardly from the connecting portion, wherein the oblique portion slidably leans against the axial rod; and
- at least two lining pads fixed on two sides of the bottom surface of the flange of the scan carriage, each lining pad formed vertically with two smooth leaning surfaces and slidably clipping the axial rod with the hooking plate therebetween.

14. The connecting device of scan carriage as in claim 13, wherein the flange of the scan carriage is formed with a lengthwise latching slot and a barb slot, and wherein the fixing portion of the hooking plate has a stopping portion latched in the latching slot and a barb engaged in the barb slot.

15. The connecting device of scan carriage as in claim 13, wherein the latching slot of the flange is formed on a middle portion thereof, and the barb slot of the flange is formed on a side thereof.

16. The connecting device of scan carriage as in claim 13, wherein each of the lining pads is generally L-shaped and has a horizontal portion fixed on a bottom surface of the flange and a vertical portion connecting to the horizontal portion.

17. The connecting device of scan carriage as in claim 16, wherein the horizontal portion of the lining pad has two engaging hooks protruding from a top surface thereof, and wherein the flange of the scan carriage is formed with two engaging slots corresponding to the engaging hooks.

18. The connecting device of scan carriage as in claim 16, wherein each horizontal portion of the lining pad further has at least one position post protruding from a top surface thereof, and wherein the flange of the scan carriage is formed with a position hole corresponding to the position post.

19. The connecting device of scan carriage as in claim 16, wherein each vertical portion of the lining pad is generally I-shaped along a horizontal cross-section, and has two ribs formed respectively on two sides thereof.

* * * * *